(12) United States Patent
Chung

(10) Patent No.: US 8,451,575 B2
(45) Date of Patent: *May 28, 2013

(54) LIGHTNING ARRESTER

(75) Inventor: Young-Ki Chung, Seoul (KR)

(73) Assignee: Uijae Electrical Research Institute (KR)

( * ) Notice: Subject to any disclaimer, the term of this patent is extended or adjusted under 35 U.S.C. 154(b) by 692 days.

This patent is subject to a terminal disclaimer.

(21) Appl. No.: 12/377,854

(22) PCT Filed: Feb. 21, 2007

(86) PCT No.: PCT/KR2007/000893

§ 371 (c)(1),
(2), (4) Date: May 6, 2010

(87) PCT Pub. No.: WO2008/020669

PCT Pub. Date: Feb. 21, 2008

(65) Prior Publication Data

US 2010/0284118 A1      Nov. 11, 2010

(30) Foreign Application Priority Data

Aug. 16, 2006  (KR) .................. 10-2006-0077237
Jan. 12, 2007  (KR) .................. 10-2007-0003648

(51) Int. Cl.
*H02H 9/00*  (2006.01)

(52) U.S. Cl.
USPC .......................................... 361/117

(58) Field of Classification Search
USPC .......................................... 361/117
See application file for complete search history.

(56) References Cited

U.S. PATENT DOCUMENTS 6,069,314 A * 5/2000 Varela .................. 174/3
7,902,455 B2 * 3/2011 Chung .................. 174/3

* cited by examiner

*Primary Examiner* — Stephen W Jackson
(74) *Attorney, Agent, or Firm* — David R. Stevens; Stevens Law Group

(57) ABSTRACT

Provided is a lightning arrester capable of previously discharging charges charged depending on an approach of lightning before the lightning occurs, thereby preventing the lightning. The lightning arrester includes: a conductive rod installed at an upper part of an object to be protected from lightning and connected to a ground part; an insulator coupled with one end of the rod; a charge pipe having a cylindrical shape with pin-shaped projections extending inward therefrom and in which space charges are charged; and a charge rod inserted into the charge pipe and connected in the middle of the rod.

15 Claims, 12 Drawing Sheets

LIGHTNING ARRESTER

TECHNICAL FIELD

The present invention relates to a lightning arrester, and more particularly, to a lightning arrester capable of preventing lightning from generating by discharging charges charged depending on an approach of a thundercloud.

BACKGROUND ART

Generally, a lightning arrester is installed at an uppermost part of a building to form a discharge path between a thundercloud and the ground to safely flow charges accumulated in the thundercloud to the ground.

When a normal thundercloud approaches the ground, an electric potential difference between the thundercloud and the ground is about one hundred million volts.

In this state, the air in the atmospheric layer functions as a good insulating body to prevent insulation breakdown between the ground and the thundercloud, i.e., lightning. However, the probability of lightning between the thundercloud and the ground is still in existence.

A lightning arrester using an electric field phenomenon (tip effect), in which an electric field is concentrated to a tip part, is referred to as a Franklin rod type.

A theory of a lightning rod using the tip effect is disclosed in Japanese Patent Laid-open Publication No. S62-216197 (Sep. 22, 1987).

The lightning rod using the tip effect uses a natural phenomenon only. Since the lightning rod is operated only when breakdown of an insulation voltage of the air occurs, it is difficult to effectively prevent lightning in the case that the thundercloud has a lightning hazard just before breakdown of an insulation voltage. For this reason, in this field, various types of lightning arresters have been developed to more effectively and safely discharge charges in the thundercloud to the ground to reduce the number of lightning strikes to an object to be protected.

For example, French Patent Laid-open Publication No. 0096655 (May 26, 1983) discloses a lightning arrester including a main electrode (an electrode grounded to the ground to concentrate ground charges using team effect) and an auxiliary electrode for collecting charges distributed in the air around the main electrode to perform a preliminary discharge with the main electrode, thereby causing discharge between the main electrode and the auxiliary electrode. Ion charges (a former trimmer) through the above discharge are discharged in the air to readily form a discharge path between a thundercloud and the main electrode, thereby absorbing charges in the thundercloud.

In addition, an active lightning arrester disclosed in Japanese Patent Laid-open Publication No. S62-216197 includes a collecting electrode for collecting charges in the air generated when a thundercloud approaches and inducing discharge between an auxiliary electrode and a main electrode, and a determination part for charging the charges of the collecting electrode into a condenser to use them as a power source, and determining variation of an amount of the charges generated from the collecting electrode. When the variation is larger than a predetermined variation rate, a conventional high voltage generating circuit switched by supplying the charges charged in the condenser into a reactor is operated to cause discharge between the main electrode and the auxiliary electrode.

However, since the lightning arrester disclosed in the French Patent, among the above conventional lightning arresters, is installed at the uppermost part of a building, a ground electric field induced by a thundercloud is insignificant at the uppermost part of the building. Therefore, when the charges collected by the charges contained in the air are filled to induce discharge, it is difficult to start the discharge due to insufficient charge, and thus, decrease discharge probability.

In addition, since the lightning arrester disclosed in the above Japanese Patent uses a plurality of electronic components, it is likely to decrease reliability. Further, since the lightning arrester is installed at the uppermost part of a building, i.e., where an operator hardly approaches, when any component of the lightning arrester needs to be replaced due to a malfunction, it is difficult for the operator to perform maintenance on the lightning arrester.

Meanwhile, in order to solve the problem, Korean Patent Registration No. 440616, issued to the same applicant as the present invention, CHUNG Young-Ki, discloses a lightning arrester.

As shown in FIG. 1, the lightning arrester disclosed in Korean Patent Registration No. 440616 includes a fixing bar 10 fixed through a fixing member 15 to the uppermost part of a structure to be protected, a main electrode part 18 connected to an upper end of the fixing bar 10, an upper polymer insulator 12 through which the fixing bar 10 passes and coupled with a lower surface of the main electrode 18 in a contact manner, an auxiliary electrode 13 through which an elongated post part 12a of the upper polymer insulator 12 passes and disposed under the main electrode part 18 in a non-contact manner to charge space charges, a lower polymer insulator 19 through which the elongated post part 12a of the upper polymer insulator 12 passes, installed under the lower surface of the auxiliary electrode part 13, and spaced apart from the fixing member 15 to obtain an insulating distance therefrom, an anti-separation disc member 10a having a through-hole through which the fixing bar 10 passes to prevent separation of the lower polymer insulator 19 from the elongated post part 12a of the upper polymer insulator 12, and a nut member 10b having an inner threaded part to be threadedly engaged with one end of the fixing bar 10 to securely fix the anti-separation member 10a.

The main electrode part 18 functions to directly attract lightning when the lightning occurs due to approach of a thundercloud. For this purpose, the main electrode part 18 includes a disc plate having a center hole through which one end of the fixing bar 10 passes, and a plurality of nibs 18a radially extending from a periphery of the disc plate at predetermined intervals.

The nibs 18a are bent upward when seen after the lightning arrester is installed.

The upper polymer insulator 12 has an elongated hollow post part 12a through which the fixing bar 12 passes, and upper and lower extension flanges 12b and 12c extending from one end of the elongated post part 12a, i.e., an upper periphery of the elongated post part 12a and spaced apart from each other to obtain an insulating distance between the main electrode part 18 and the auxiliary electrode part 13.

The auxiliary electrode part 13 includes: a first electrode member 13a having a through-hole through which the elongated post part 12a passes, and a plurality of projection pins 13e extending upward from a periphery thereof at predetermined intervals, disposed under the lower extension flange 12c of the upper polymer insulator 12, and not in contact with the main electrode part 18, thereby absorbing a larger amount of charges in the air depending on approach of a thundercloud; a pair of second auxiliary electrode members 13b having an upper surface in contact with a lower surface of the first auxiliary electrode member 13a, and a through-hole through which the elongated post part 12a passes; a third auxiliary electrode member 13c having a hollow post shape through which the elongated post part 12a of the upper polymer insulator 12 passes such that the elongated post part 12a projects downward from the third auxiliary electrode member 13c by a predetermined distance, an upper end of which is in contact with a lower surface of the second auxiliary electrode members 13b, and an inner periphery of which is spaced apart from an outer periphery of the elongated post part 12a passed therethrough; and a filler material 13d formed of titanium dioxide filled in the third auxiliary electrode member 13c through the medium of O-rings inserted into both ends thereof to increase a filling amount and prevent leakage of the filler material 13d.

The lower polymer insulator 19 includes a short post part 19a having a through-hole through which the elongated post part 12a of the upper polymer insulator 12 passes, and upper and lower extension flanges 19b and 19c extending from one end of the short post part 19a, i.e., an upper periphery of the short post part 19a and spaced apart from each other to obtain an insulating distance between the auxiliary electrode part 13 and the fixing member 15.

When a thundercloud approaches the conventional lightning arrester installed at the uppermost part of a building to be protected, the fixing bar 10 and the main electrode part 18 in contact with the upper end of the fixing bar 10 are charged with ground charges, the auxiliary electrode part 13 not in contact with the fixing bar 10 and the main electrode part 18 by the upper polymer insulator 12 is charged with space charges by the filler material 13d formed of titanium dioxide filled between the third auxiliary electrode member 13c and the elongated post part 12a of the upper polymer insulator 12, thereby attracting lightning generated from the thundercloud far from the lightning arrester.

As a result, it is possible to attract lightning and stably discharge the lightning to the ground even at a low voltage due to a far distance of the thundercloud.

However, in the conventional lightning arrester, when the fixing bar 10 and the main electrode part 18, in which ground charges are charged, are spaced a certain distance apart from the auxiliary electrode part 13, in which space charges formed by approach of a thundercloud are charged, discharge performance of the lightning arrester may be decreased, thereby lowering lightning prevention ability.

In addition, Korean Patent Registration No. 433011, issued to the same applicant as the present invention, CHUNG Young-Ki, discloses a lightning arrester.

As shown in FIG. 2, the lightning arrester of Korean Patent Registration No. 433011 includes a fixing bar 20 fixed through a fixing member 29 to the uppermost part of a building to be protected, a cap member 21 fastened to one end of the fixing bar 20, a polymer insulator 22 mounted on an upper end of the fixing bar 20, formed of an electrostatic induction sphere, and through which an upper end of the fixing bar 20 passes to increase an insulating distance between the cap member 21 and an auxiliary discharge member 24 to be described, the auxiliary discharge member 24 having at least one thin plate passing through a lower center of the polymer insulator 22, a preliminary discharge cap member 25 formed of a conductive material and having a through-hole through which the lower end of the polymer insulator 22 passes such that an upper surface of the cap member 25 is in contact with a lower surface of the auxiliary discharge member 24, and a preliminary discharge member 26 fixed to the fixing bar 20 through the medium of a plurality of insulating ring members 27 disposed under the preliminary discharge cap member 25, formed of a circular disc shape, and having a downward projection, a through-hole through which the fixing bar 20 passes, and a fixing hole formed at a periphery of the projection and in communication with the through-hole to fix the preliminary discharge member to a periphery of the fixing bar 20 using a screw.

In addition, a protection member 23 is attached to an upper surface of the auxiliary discharge member 24 to prevent damage of the preliminary discharge member 26 from an external power.

DISCLOSURE OF INVENTION

Technical Problem

However, in the conventional lightning arrester, since an opposite area for discharging between ground charges and space charges, i.e., an opposite area between a portion electrically connected to the fixing bar 20, in which the ground charges are charged and the electrostatic induction sphere is small, and there is no structure or means for promoting the discharge between the ground charges and the space charges, it is difficult to induce a preliminary discharge phenomenon for preventing lightning.

In order to solve the foregoing and/or other problems, it is an object of the present invention to provide a lightning arrester for protecting a building from lightning that is capable of improving a preliminary discharge capability between space charges and ground charges, which are charged to the lightning arrester, to prevent generation of lightning.

It is another object of the present invention to provide a lightning arrester capable of improving a preliminary discharge capability between space charges and ground charges, which are charged to the lightning arrester, to prevent generation of lightning by adding a charge pin to the lightning arrester.

Technical Solution

One aspect of the present invention provides a lightning arrester including: a conductive rod installed at an upper part of an object to be protected from lightning and connected to a ground means; an insulator coupled with one end of the rod; a charge pipe having a cylindrical shape with pin-shaped projections extending inward therefrom and in which space charges are charged; and a charge rod inserted into the charge pipe and connected in the middle of the rod.

In addition, the lightning arrester may further include a first charge means coupled with the rod under the insulator through the medium of an insulating body such that space charges in the air are charged by a thundercloud; and a second charge means coupled to the rod corresponding to the first charge means such that ground charges supplied from the ground are charged.

Another aspect of the present invention provides a lightning arrester including: a conductive rod installed at an upper part of an object to be protected from lightning and connected to a ground means; an insulator coupled with one end of the rod; a charge pipe having a cylindrical shape with pin-shaped projections extending inward therefrom and in which charges having a polarity opposite to ground charges are charged; and a plurality of charge pins disposed at an upper part of the charge pipe such that space charges in the air are charged by a thundercloud.

Advantageous Effects

In accordance with an exemplary embodiment of the present invention, it is possible to provide a lightning arrester capable of previously discharging space charges distributed in the air and ground charges supplied from the ground when a thundercloud having a high probability of lightning approaches, thereby reducing the probability of lightning.

In particular, a dielectric or a charge pin is disposed between charge plates to enable an increase in a preliminary discharge performance by space charges and ground charges.

In addition, a tube-shaped discharge means is additionally provided, in addition to a disc-shaped charge plate, to previously discharge space charges of a thundercloud, thereby remarkably reducing probability of lightning.

MODE FOR THE INVENTION

1. First Embodiment (See FIG. 3)

Figure 1:
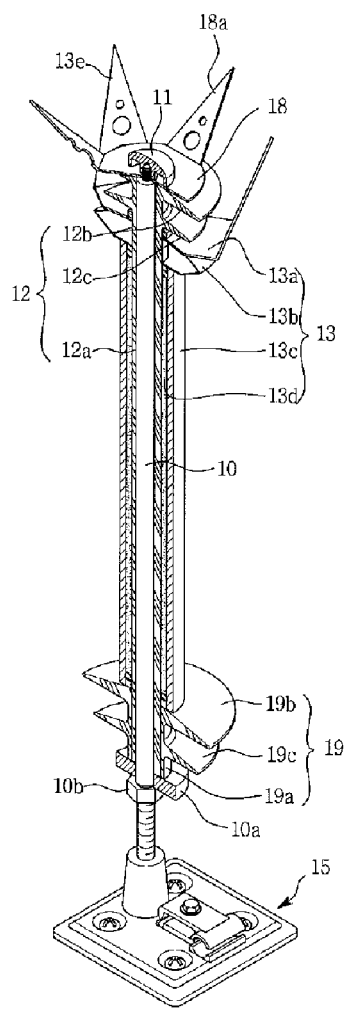
FIG. 1 is a partially cut perspective view of a conventional lightning arrester.
Figure 2:
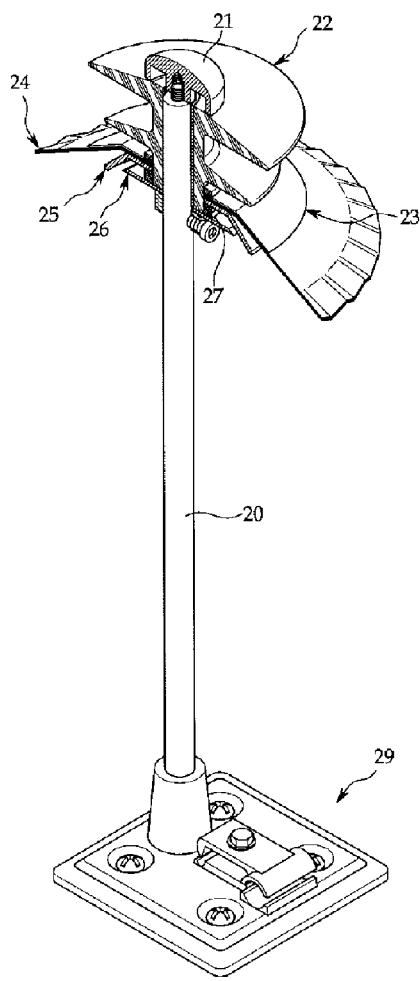
FIG. 2 is a partially cut perspective view of another conventional lightning arrester.
Figure 3:
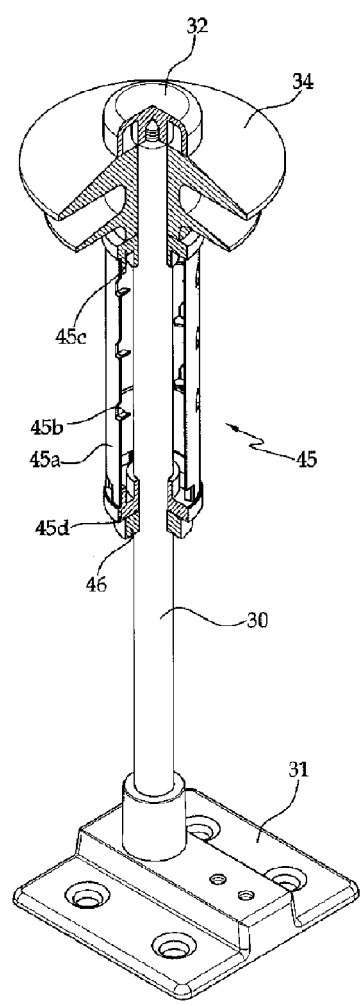
FIG. 3 is a partially cut perspective view of a lightning arrester in accordance with a first exemplary embodiment of the present invention.

As shown in FIG. 3, a lightning arrester in accordance with a first exemplary embodiment of the present invention includes a fixing part 31 installed at the uppermost part of a building and connected to a ground means, a rod 30 fixed to one end of the fixing part 31 and in which ground charges are charged, a rod cap 32 coupled with an upper end of the rod 30 to induce lightning, an insulator 34 coupled with the other end part of the rod 30, and a charge means 45 mounted on the rod 30.

The charge means 45 is comprised of a charge pipe 45a having a tube-shaped body through which the rod passes and pin-shaped projections 45b cut and bent toward the rod 30, and first and second caps 45d for coupling both ends of the charge pipe 45a with the rod 30. The second cap 45d is biased toward the insulator 34 by a stopper 46.

At this time, the charge pipe 45a is parallel to the rod 30.

Hereinafter, operation of the lightning arrester in accordance with an exemplary embodiment of the present invention will be described.

First, the fixing part 31 is fixed to an upper part (preferably, the uppermost part) of a building, and the rod 30, on which the charge pipe 45a and so on are mounted, is fixed to the fixing part 31.

When a thundercloud having a high probability of lightning approaches the lightning arrester in accordance with a first exemplary embodiment of the present invention installed at a building, space charges distributed in the air are charged to the charge pipe 45a by the thundercloud, and ground charges, having a polarity opposite to the space charges and supplied from the ground, are charged to the rod 30.

As described above, when the space charges and the ground charges are gradually charged to the charge pipe 45a and the rod 30 depending on approach of the thundercloud, a charge voltage between the charge pipe 45a and the rod 30 is raised by increase of a quantity of electric charge to cause a discharge (generally, corona discharge).

At this time, since the projections 45b of the charge pipe 45a cut and bent toward the rod 30 have a pin shape to improve a discharge performance to the rod 30, it is possible to readily perform discharge between the space charges and the ground charges.

2. Second Embodiment (See FIGS. 4 and 5)

Figure 4:
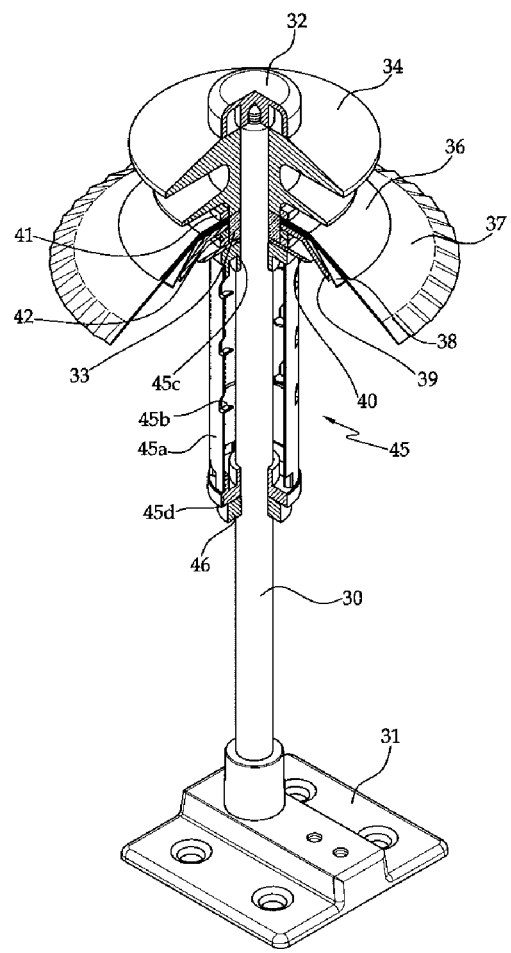
FIG. 4 is a partially cut perspective view of a lightning arrester in accordance with a second exemplary embodiment of the present invention.
Figure 5:
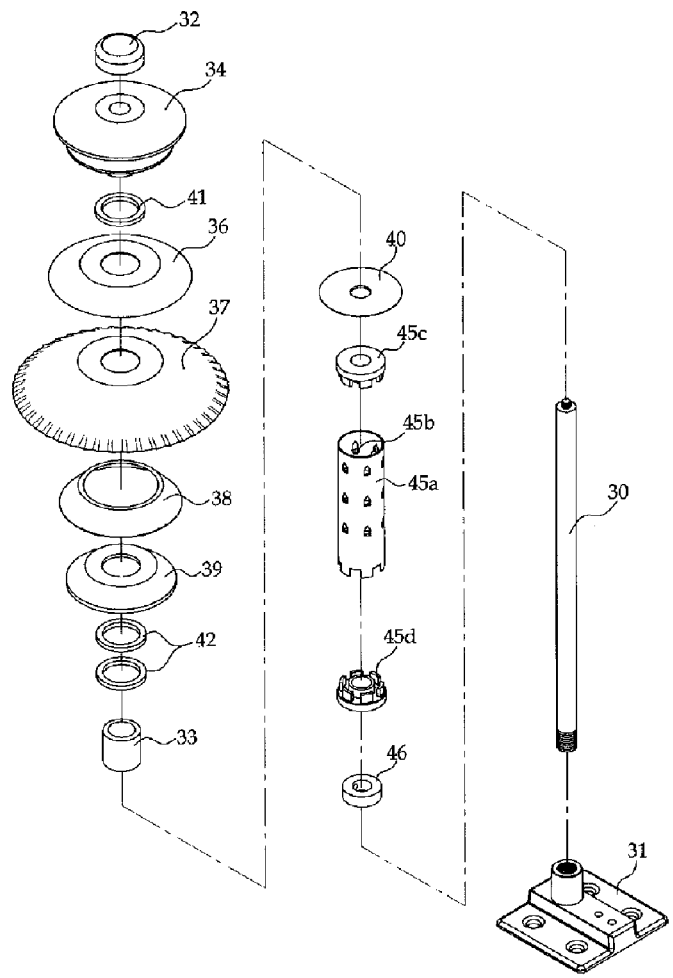
FIG. 5 is an exploded perspective view of the lightning arrester in accordance with a second exemplary embodiment of the present invention.

As shown in FIGS. 4 and 5 (like reference numerals designate like components), a lightning arrester in accordance with a second exemplary embodiment of the present invention includes a fixing part 31 installed at an upper end of a building and connected to a ground means, a rod 30 fixed to the fixing part 31 at its one end and to which ground charges are charged, a rod cap 32 coupled with the other end of the rod 30 to induce lightning, an insulator 34 coupled with the other end of the rod 30, first charge means 33, 36 to 39, 41, and 42 mounted on the rod 30 under the insulator 34, a second charge means 45 mounted on the rod 30 under the first charge means 33, 36 to 39, 41, and 42, and a discharge means 40 in which charges having a polarity opposite to the space charges are charged to correspond to the first charge means 33, and 36 to 39.

The first charge means 33, 36 to 39, 41, and 42 includes first, second, third, and fourth charge plates 36, 37, 38 and 39 coupled with the rod 30 under the insulator 34 and being substantially disc-shaped having a center hole such that space charges are charged by a thundercloud, and a dielectric 33 formed of a dielectric material, disposed between the rod 30 and the first to fourth charge plates 36 to 39 in a radial direction, and inserted between a lower end of the insulator 34 and an upper end of the discharge means 40 in a longitudinal direction of the rod 30.

The first to fourth charge plates 36 to 39 have center holes coupled with an outer periphery of the dielectric 33 mounted on the rod 30. In addition, the charge plates 36 to 39 have an inverse parabola shape with a center part perpendicular to the rod 30 and a periphery part extending downward from the center part. The charge plates 36 to 39 are adhered to each other.

Further, a first ring 41 formed of an insulating body is inserted between the first charge plate 36 and the insulator 34.

In addition, the second charge plate 37 has a diameter two times larger than that of the first charge plate 36, and a wrinkled periphery. The third charge plate 38 has substantially the same size as the first charge plate 36, and the fourth charge plate 39 has a diameter smaller than that of the third charge plate 38.

The first to fourth charge plates 36 to 39 are fixed to the dielectric 33, and a second ring 42 is fixed to the other part of the dielectric 33.

The discharge means 40 has a disc shape having a center hole with a diameter smaller than that of the fourth charge plate 39. An upper surface of the discharge means 40 is opposite to the bottom surface of the fourth charge plate 39.

The second charge means 45 includes a charge pipe 45a having a tube-shaped body through which the rod 30 passes and pin-shaped projections 45b cut and bent toward the rod 30, and first and second caps 45c and 45d for coupling both ends of the charge pipe 45a to the rod 30.

The dielectric 33 has a tube shape and is coupled with the rod 30. The first to fourth charge plates 36 to 39 are coupled with an outer periphery of the dielectric 33.

Therefore, the dielectric 33 formed of insulating and dielectric material is disposed between the rod 30 and the first to fourth charge plates 36 to 39.

In addition, the dielectric 33 is formed of insulating and dielectric material such as titanium dioxide ($TiO_2$), silicon dioxide ($SiO_2$), or the like, to increase capacitance between the rod 30 and the first to fourth charge plates 36 to 39, thereby readily generating the discharge.

Here, the reason for using titanium dioxide ($TiO_2$), silicon dioxide ($SiO_2$), or the like, as the dielectric 33 is that the titanium dioxide and the silicon dioxide have high mechanical strength appropriate to obtain electric insulation and dielectric characteristics and to secure maintain mechanical coupling between the first to fourth charge plates 36 to 39 and the discharge means 40.

The second charge means 45 is securely fixed to the discharge means 40 by a stopper 46 fixed to the rod 30 at its one end.

Operation of the lightning arrester in accordance with a second exemplary embodiment of the present invention will be described below.

First, the fixing part 31 is fixed to an upper end (preferably the uppermost part) of a building to be protected from lightning, and the rod 30, on which the first charge means 33, 36 to 39, 41, and 42, the discharge means 40, and the second charge means 45 are mounted, is fixed to the fixing part 31.

Then, when a thundercloud having a high probability of lightning approaches the lightning arrester in accordance with a second exemplary embodiment of the present invention installed at the building, space charges distributed in the air are charged to the first to fourth charge plates 36 to 39 by the thundercloud, and ground charges having a polarity opposite to the space charges and supplied from the ground are charged to the rod 30 and the discharge means 40.

In addition, the space charges are charged to the charge pipe 45a of the second charge means 45.

As described above, when the space charges are charged to the first to fourth charge plates 36 to 39 and the charge pipe 45a and the ground charges are gradually charged to the discharge means 40 and the rod 30 depending on approach of the thundercloud, charge voltages between the first to fourth charge plates 36 to 39 and the charge pipe 45a, and between the discharge means 40 and the rod 30 are raised by increase of a quantity of electric charge to cause a discharge (generally, corona discharge).

At this time, since the dielectric 33 interposed between the first to fourth charge plates 36 to 39 increases capacitance between the first to fourth charge plates 36 to 39 and the discharge means 40 to increase a potential difference by the space charges and the ground charges, it is possible to more readily perform the discharge.

In addition, since the projections 45b of the charge pipe 45a of the second charge means 45 cut and bent toward the rod 30 have a pin shape to improve a discharge performance to the rod 30, it is possible to readily perform discharge between the space charges and the ground charges.

3. Third Embodiment (See FIGS. 6 and 9)

Figure 6:
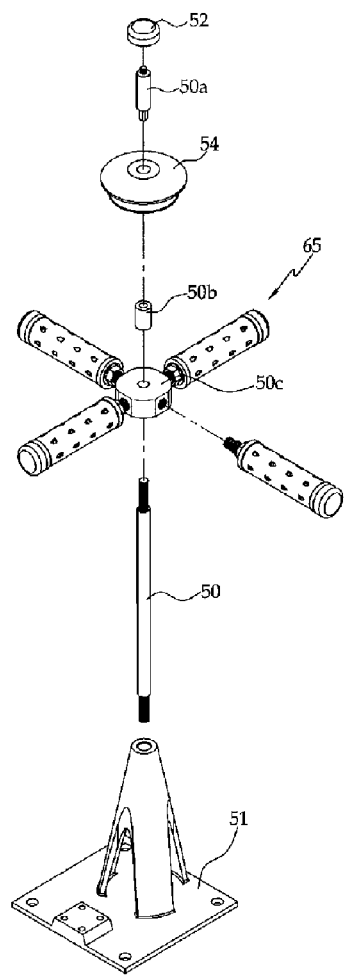
FIG. 6 is an exploded perspective view of a lightning arrester in accordance with a third exemplary embodiment of the present invention.

As shown in FIG. 6, a lightning arrester in accordance with a third exemplary embodiment of the present invention includes a fixing part 51 installed at an upper end of a building and connected to a ground means, a rod 50 fixed to the fixing part 51 at its one end and to which ground charges are charged, a connection part 50c having a plurality of connection holes formed in a radial direction thereof and connected to the other end of the rod 50, a connection rod 50b connected to one side of the connection part 50c, an upper rod 50a connected to one side of the connection rod 50b, a rod cap 52 coupled to the other end of the upper rod 50a, an insulator 54 disposed under the rod cap 52 of the upper rod 50a, and a plurality of charge means 65 coupled with the rod 50 under the insulator 54 through the medium of the connection part 50c in a radial direction.

The charge means 65 have substantially the same constitution as the charge means 45 of the first embodiment, except that the plurality of charge means 65 are horizontally installed through the connection part 50c in a radial direction, rather than in a vertical direction as in the first embodiment.

Figure 9:
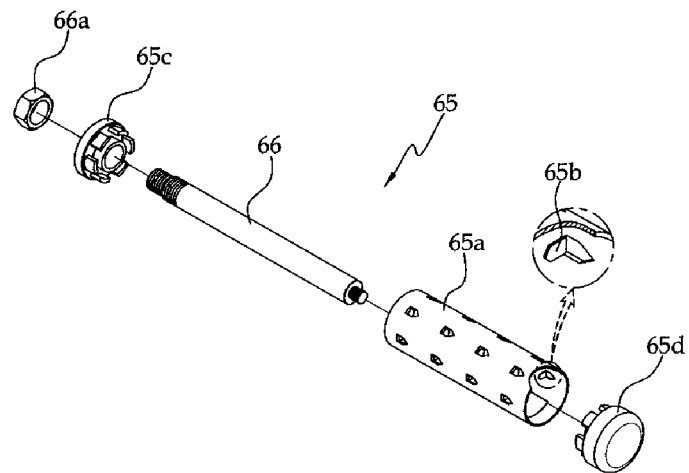
FIG. 9 is an exploded perspective view of a discharge means of the third embodiment of the present invention or a second discharge means of the fourth embodiment of the present invention.

As shown in FIG. 9, the charge means 65 includes an auxiliary rod 66 threadedly engaged with a connection hole formed at an outer periphery of the connection part 50c, and are radically disposed in plural number centered on the rod 50, a charge pipe 65a having a tube-shaped body through which the auxiliary rod 66 passes and pin-shaped projections 65b cut and bent toward the auxiliary rod 66, and first and second caps 65c and 65d for coupling both ends of the charge pipe 65a to the auxiliary rod 66.

At this time, the charge means 65 is fixed to the auxiliary rod 66 by the second cap 65d and a nut 66a.

Operation of the lightning arrester in accordance with a third exemplary embodiment of the present invention will be described below.

First, the fixing part 51 is fixed to an upper end (preferably the uppermost part) of a building to be protected from lightning, and the rod, on which the charge means 65 is mounted, is fixed to the fixing part 51.

Then, when a thundercloud with a high probability of lightning approaches a lightning arrester in accordance with a third exemplary embodiment of the present invention installed at the building, space charges distributed in the air are charged to the charge pipe 65a of the charge means 65 by the thundercloud, and ground charges supplied from the ground are charged to the auxiliary rod 66 through the rod 50.

At this time, the auxiliary rods 66 and the charge pipes 65a respectively, are disposed at predetermined intervals around the rod 50.

As described above, when the space charges are charged to the charge pipe 65a of the charge means 65, and the ground charges are gradually charged to the auxiliary rod 66 depending on approach of the thundercloud, a charge voltage between the charge pipe 45a and the auxiliary rod 66 is increased by increasing each charge amount to perform discharge (generally, corona discharge).

At this time, since the projections 65b of the charge pipe 65 of the charge means 65 cut and bent toward the auxiliary rod 66 have a pin shape to increase discharge performance to the auxiliary rod 66, it is possible to readily perform discharge between the space charges and the ground charges.

In particular, since the third embodiment of the present invention has a larger number of charge means 65 (four charge means disposed at 90 intervals) than the first embodiment, it is possible to readily accumulate space charges to improve preliminary discharge performance.

4. Fourth Embodiment (See FIGS. 7 and 9)

Figure 7:
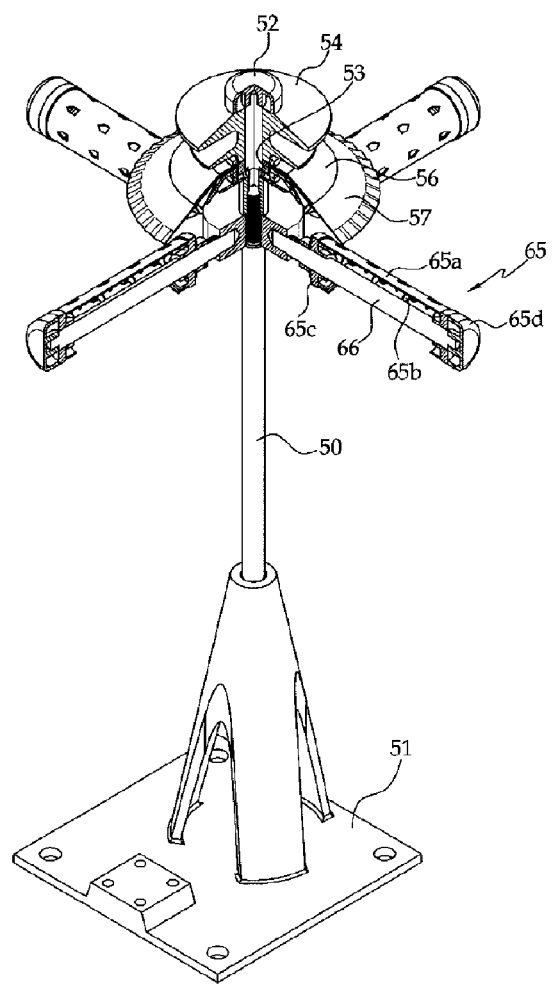
FIG. 7 is a partially cut perspective view of the lightning arrester in accordance with a fourth exemplary embodiment of the present invention.
Figure 8:
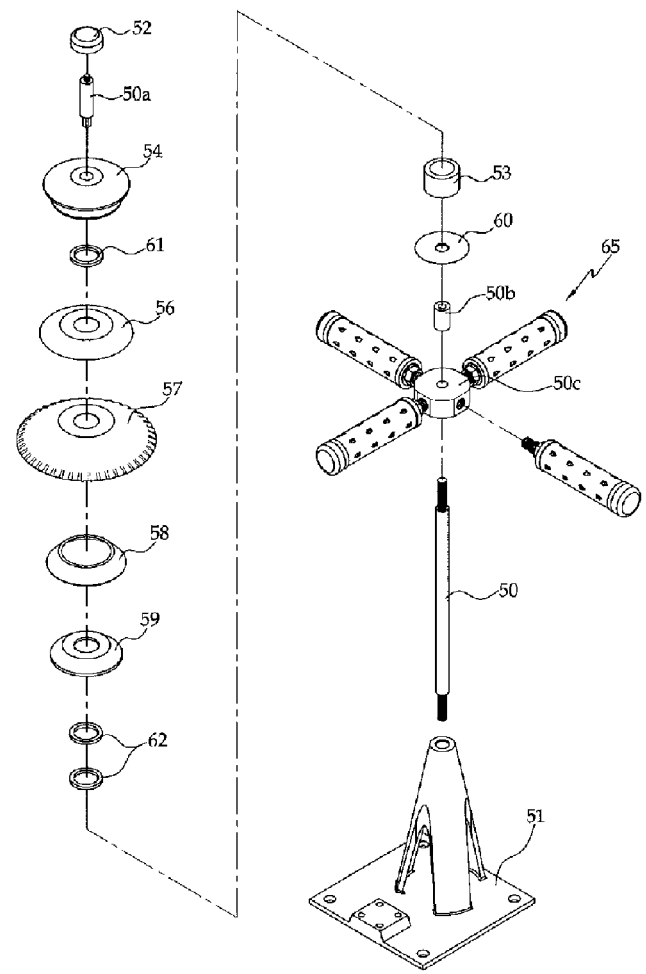
FIG. 8 is an exploded perspective view of the lightning arrester in accordance with a fourth exemplary embodiment of the present invention.

As shown in FIGS. 7 to 9 (like reference numerals refer to like element of the third embodiment), a lightning arrester in accordance with a fourth exemplary embodiment of the present invention includes a fixing part 51 installed at an upper end of a building and connected to a ground means, a rod 50 fixed to the fixing part 51 at its one end and to which ground charges are charged, a connection part 50c having a plurality of connection holes formed in a radial direction thereof and connected to the other end of the rod 50, a connection rod 50b connected to one side of the connection part 50c, an upper rod 50a connected to one side of the connection rod 50b, a rod cap 52 coupled to the other end of the upper rod 50a, an insulator 54 coupled with the other end of the upper rod 50a, first charge means 53, 56-59, 61, and 62 mounted on the upper rod 50a under the insulator 54, and second charge means 65 mounted on the upper rod 65a under the first charge means 53, 56-59, 61, and 62 through the connection part 50c in a radial direction.

The first charge means 53, 56-59, 61, and 62 includes first to fourth charge plates 56, 57, 58 and 59 coupled with the rod 50 under the insulator 54 from upside to downside and formed to be substantially disc-shaped such that space charges are charged by a thundercloud, and a dielectric 53 formed of a dielectric material, disposed between the rod 50 and the first to fourth charge plates 56-59 in a radial direction, and inserted between a lower end of the insulator 54 and an upper end of the charge means 60 and a charge means 60 in a longitudinal direction of the rod 50.

The first to fourth charge plates 56-59, which are adhered to each other, have circular holes coupled with an outer periphery of the dielectric 53 mounted on the rod 50, center parts perpendicular to the rod 50, and flanges extending downward from the center parts to form parabola shapes, respectively.

In addition, a first ring 61 formed of an insulating material is inserted into the upper rod 50a between the first charge plate 56 and the insulator 54.

Further, the second charge plate 57 has a diameter two times larger than the first charge plate 56, and a peripheral wrinkle part, the third charge plate 58 has a diameter similar to the first charge plate 56, and the fourth charge plate 59 has a smaller diameter than the third charge plate 58.

The first to fourth charge plates 56-59 are coupled with the dielectric 53, and a second ring 62 formed of an insulating material is fixed to the other part of the dielectric 53 to securely fix the charge plates 56-59.

The discharge means 60 is formed of a disc plate having a smaller diameter than the fourth charge plate 59. Therefore, the discharge means 60 is coupled with the rod 50 under the charge plate 56-59.

The dielectric 53 has a tubular shape coupled with the upper rod 50a, and the first to fourth charge plates 56-59 are coupled with a periphery of the dielectric 53.

Therefore, the dielectric 53 formed of an insulating and dielectric material is interposed between the upper rod 50a and the first to fourth charge plates 56-59.

In addition, since the dielectric 53 is formed of an insulating and dielectric material such as titanium dioxide ($TiO_2$), silicon dioxide ($SiO_2$), or the like, capacitance between the upper rod 50a and the first to fourth charge plates 56-59 can be increased to more readily perform discharge.

As described above, the first charge means 53, 56-59, 61, and 62 in accordance with a fourth exemplary embodiment of the present invention have a structure similar to the first charge means 33, 36-39, 41, and 42 of the second embodiment.

In addition, the second charge means 65 in accordance with a fourth exemplary embodiment of the present invention has a constitution similar to the charge means 45 of the first embodiment and the second charge means 45 of the second embodiment, except that the plurality of second charge means 65 are installed under the first charge means 53, 56-59, 61, and 62, i.e., at the upper end of the rod 50 through the connection part 50c in a radial direction, rather than in a vertical direction as in the first and second embodiments.

As shown in FIG. 9, the second charge means 65 includes an auxiliary rod 66 threadedly engaged with a connection hole formed at an outer periphery of the connection part 50c, a charge pipe 65a having a tubular shape through which the auxiliary rod 66 passes and pin-shaped projections 65b cut and bent toward the auxiliary rod 66, and first and second caps 65c and 65d for coupling both ends of the charge pipe 65a to the auxiliary rod 66.

At this time, the second charge means 65 is fixed to the auxiliary rod 66 by the second cap 65d and a nut 66a.

The lightning arrester in accordance with a fourth exemplary embodiment of the present invention will be operated as described below.

First, the fixing part 51 is fixed to an upper end (preferably the uppermost part) of a building to be protected from lightning, and the rod 50, on which the first charge means 53, 56 to 59, 61, and 62, the discharge means 50, and the second charge means 65 are mounted, is fixed to the fixing part 51.

Then, when a thundercloud having a high probability of lightning approaches the lightning arrester in accordance with a fourth exemplary embodiment of the present invention installed at the building, space charges distributed in the air are charged to the first to fourth charge plates 56 to 59 by the thundercloud, and ground charges having a polarity opposite to the space charges and supplied from the ground are charged to the upper rod 50a and the discharge means 60 through the rod 50.

In addition, the space charges are charged to the charge pipe 65a of the second charge means 65, and the ground charges are charged to the auxiliary rod 66.

As described above, when the space charges are charged to the first to fourth charge plates 56-59 of the first charge means 53, 56-59, 61, and 62 and the charge pipe 65a of the second charge means 65 and the ground charges are gradually charged to the discharge means 60 and the auxiliary rod 66 depending on approach of the thundercloud, charge voltages between the first to fourth charge plates 56-59 and the charge pipe 65a, and between the discharge means 60 and the auxiliary rod 66 are raised by increase of a quantity of electric charge to cause a discharge (generally, corona discharge).

At this time, since the dielectric 53 interposed between the first to fourth charge plates 56-59 increases capacitance between the first to fourth charge plates 56-59 and the discharge means 60 to increase a potential difference by the space charges and the ground charges, it is possible to more readily perform the discharge.

In addition, since the projections 65b of the charge pipe 65a of the second charge means 65 cut and bent toward the auxiliary rod 66 have a pin shape to improve a discharge performance to the auxiliary rod 66, it is possible to readily perform discharge between the space charges and the ground charges.

In particular, the lightning arrester in accordance with a fourth exemplary embodiment of the present invention has the plurality of second charge means 65 (four charge means are disposed at 90 intervals), in contrast to the first and second embodiments, thereby more readily accumulating space charges to increase a preliminary discharge performance.

5. Fifth Embodiment (Not Shown)

A lightning arrester in accordance with a fifth exemplary embodiment of the present invention has a dual structure of the charge means 45 of the first embodiment, in which a pair of charge means 45 are vertically disposed in a longitudinal direction of the rod 30.

6. Sixth Embodiment (See FIG. 10)

Figure 10:
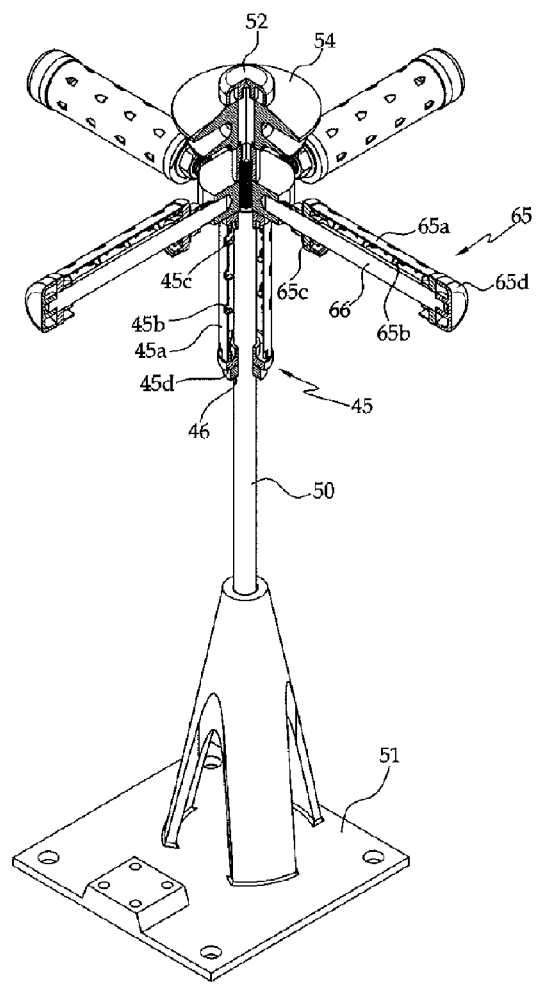
FIG. 10 is a partially cut perspective view of a lightning arrester in accordance with a sixth exemplary embodiment of the present invention.

As shown in FIG. 10, a lightning arrester in accordance with a sixth exemplary embodiment of the present invention has a structure such that the first and third embodiments are mixed, including a fixing part 51, a rod 50, a rod cap 52, an insulator 54, a vertical charge means 45 of the first embodiment, and radial charge means 65 of the third embodiment.

7. Seventh Embodiment (Not Shown)

A lightning arrester in accordance with a seventh exemplary embodiment of the present invention has a structure such that the second and third embodiments are mixed.

8. Eighth Embodiment (See FIGS. 11 and 12)

Figure 11:
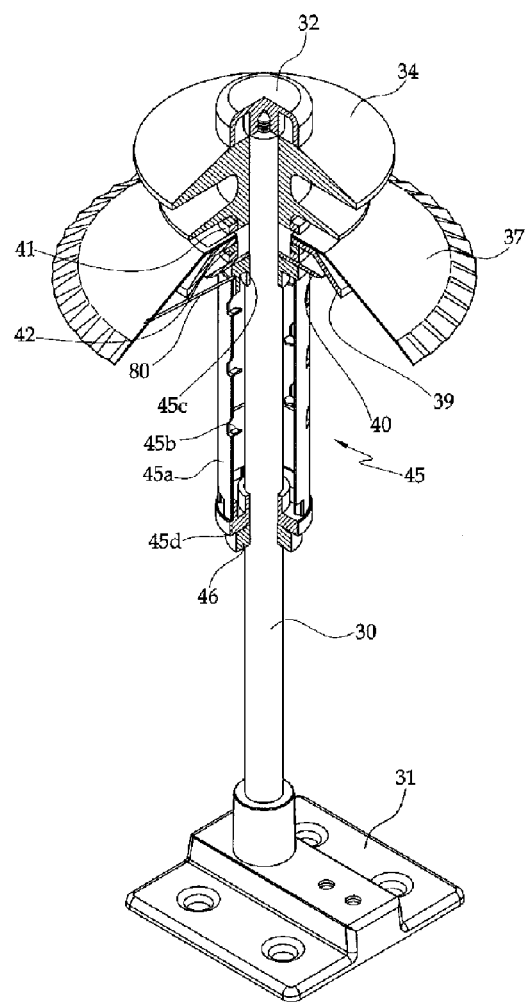
FIG. 11 is a partially cut perspective view of a lightning arrester in accordance with an eighth exemplary embodiment of the present invention.
Figure 12:
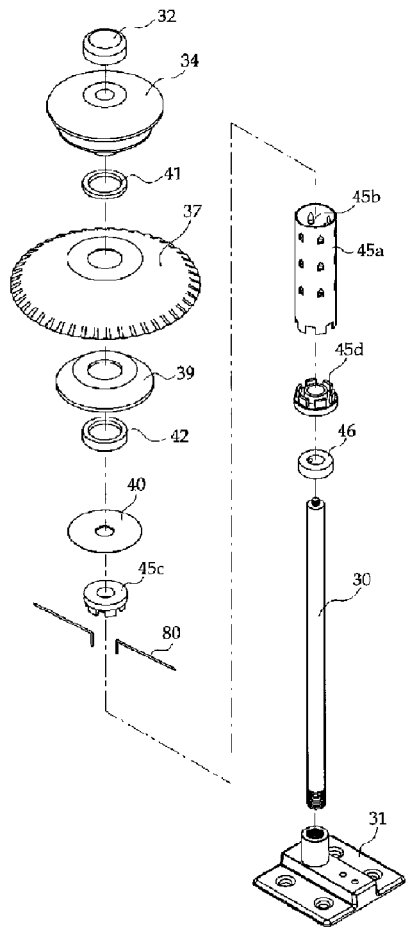
FIG. 12 is an exploded perspective view of the lightning arrester in accordance with an eighth exemplary embodiment of the present invention.

FIG. 11 is a partially cut perspective view of a lightning arrester in accordance with an eighth exemplary embodiment of the present invention, and FIG. 12 is an exploded perspective view of the lightning arrester in accordance with an eighth exemplary embodiment of the present invention. As shown, the lightning arrester includes a fixing part 31 installed at an upper end of a building and connected to a ground means, a rod 30 fixed to the fixing part 31 at its one end and to which ground charges are charged, a rod cap 32 coupled with the other end of the rod 30 to induce lightning, an insulator 34 coupled with the other end of the rod 30, charge means 37, 39, 45 and 80 mounted on the rod 30 under the insulator 34, and a discharge means 40 mounted on the rod 30 under the charge means 37 and 39 and to which charges having a polarity opposite to space charges correspond to the charge means 37 and 39.

The charge means 37, 39, 45 and 80 include first and second charge plates 37 and 39 sequentially coupled with the rod 30 under the insulator 34 through the medium of an insulating material and being substantially disc-shaped such that space charges are charged by a thundercloud, a charge pipe 45a having a cylindrical shape with pin-shaped projections cut and bent toward the rod 30 and to which space charges are charged, and a plurality of charge pins 80 to connect the charge pipe 45a and the charge plates 37 and 39 and to which space charges in the air are charged by a thundercloud.

The first and second charge plates 37 and 39 have center holes coupled with the rod 30, center parts formed perpendicular to the rod, and periphery parts extending downward from the center parts to form parabola shapes with the center parts, which are adhered to each other.

In addition, the charge pin 80 is bent such that one side of the charge pin 80 is fixed through spot wielding, facing bottom surfaces of the first and second charge plates 37 and 39, and an opposite end of the charge pin 80 is fixed to an inner side of the charge pipe 45a through spot welding.

Therefore, the charge means 37, 39 and 45 are electrically connected to each other by the charge pins 80, and insulated from the rod cap 32 and the rod 30 through the medium of an insulating body.

In addition, the insulator 34 further includes a bush coupled with one end of the rod 30, and a first ring 41 formed of an insulating material is inserted between the insulator 34 and the first charge plate 37.

The first charge plate 37 has a diameter about three times larger than the second charge plate 39 and a peripheral wrinkle part.

The first and second charge plates 37 and 39 are fixed by a second ring 42 formed of an insulating material.

The discharge means 40 is formed of a disc plate having a smaller diameter than the second charge plate 39. Therefore, the discharge means 40 is opposite to a bottom surface of the second charge plate 39.

The charge pipe 45a has a tubular shape through which the rod 30 passes and having pin-shaped projections cut and bent toward the rod 30, and first and second caps 45c and 45d for coupling both ends thereof to the rod 30.

In addition, the first and second rings 41 and 42 is formed of a material having insulating and dielectric properties such as titanium dioxide ($TiO_2$), silicon dioxide ($SiO_2$), or the like, to increase capacitance between the rod 30 and the first and second charge plates 37 and 39, thereby more readily performing discharge.

Here, the reason for forming the first and second rings 41 and 42 using titanium dioxide ($TiO_2$), silicon dioxide ($SiO_2$), or the like, is that insulating and dielectric properties can be obtained and mechanical coupling between the first and second charge plates 37 and 39 and the discharge means 40 can be securely maintained using a material having high mechanical strength.

The charge pipe 45a is securely adhered to the charge means 40 by a stopper 46 fixed to the rod 30 at its one end.

Operation of the lightning arrester in accordance with an eighth exemplary embodiment of the present invention will be described below.

First, the fixing part 31 is fixed to an upper end (preferably the uppermost part) of a building to be protected from lightning, and the rod 30, on which the charge plates 37 and 39, the charge pipe 45a, the charge pins 80, and the discharge means 40 are mounted, is fixed to the fixing part 31.

Then, when a thundercloud having a high probability of lightning approaches the lightning arrester in accordance with an eighth exemplary embodiment of the present invention installed at the building, space charges distributed in the air are charged to the charge plates 37 and 39 by the thundercloud, and ground charges having a polarity opposite to the space charges and supplied from the ground are charged to the rod 30 and the discharge means 40.

In addition, the space charges are charged to the charge pipe 45a of the charge pins 80.

As described above, when the space charges are charged to the first and second charge plates 37 and 39, which are electrically connected to each other, and the ground charges are gradually charged to the discharge means 40 and the rod 30 depending on approach of the thundercloud, charge voltages between the first and second charge plates 37 and 39, the charge pipe 45a and the charge pins 80, and between the discharge means 40 and the rod 30 are raised by increase of a quantity of electric charge to cause a discharge (generally, corona discharge).

At this time, since the charge pin 80 is bent such that one side of the charge pin 80 is fixed through spot welding, facing bottom surfaces of the first and second charge plates 37 and 39, and an opposite end of the charge pin 80 is fixed to an inner side of the charge pipe 45a through spot welding the first and second charge plates 37 and 39 and the charge pipe 45a are electrically connected to each other such that space charges are charged to the first and second charge plates 37 and 39 and the charge pipe 45a by a thundercloud.

Therefore, the charge pins 80 increases capacitance between the first and second charge plates 37 and 39 and the discharge means 40 to increase a potential difference by the space charges and the ground charges, it is possible to more readily perform the discharge.

In addition, since the projections 45b of the charge pipe 45a cut and bent toward the rod 30 have a pin shape to improve a discharge performance to the rod 30, it is possible to readily perform discharge between the space charges and the ground charges.

9. Performance Comparison of Lightning Arresters

Figure 13:
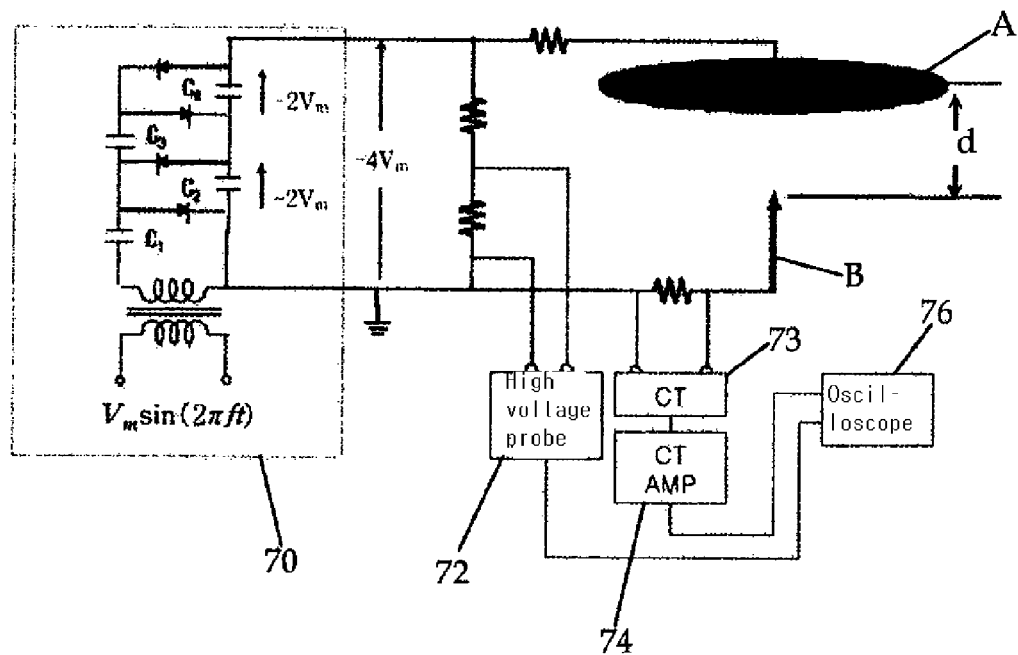
FIG. 13 is a circuit diagram of a test apparatus for testing corona discharge of a lightning arrester.

Performance of the lightning arrester in accordance with an exemplary embodiment of the present invention and various conventional lightning arresters have been compared using a test apparatus shown in FIG. 13.

The test apparatus shown in FIG. 13 includes a high voltage generating part 70 for generating a high voltage to apply a negative (−) direct current to a circular plate A having a diameter of 1 m and to which each lightning arrester B is connected to be tested, a high voltage probe 72 connected to an output terminal of the high voltage generating part 70 to draw a voltage, a current detection part 73 connected to the output terminal of the high voltage generating part 70, a current amplification part 74 for amplifying the current output from the current detection part 73, and an oscilloscope 76 for receiving a voltage and current from the high voltage probe 72 and the current amplification part 74 to display the voltage and current.

In FIG. 13, a gap d represents a distance between the circular plate A and each lightning arrester B.

In order to evaluate corona discharge characteristics of each lightning arrester using the test apparatus, a negative (−) direct voltage output of the high voltage generating part 70 is connected to the circular plate A, and a parabola part is connected to each lightning arrester B to be tested.

At this time, the gap d is 80 cm in order to measure corona discharge current, and an output voltage of the high voltage generating part 70 is applied to a maximum voltage of 400 kV. Relationship between the current and voltage due to the corona discharge is shown in FIG. 14.

Figure 14:
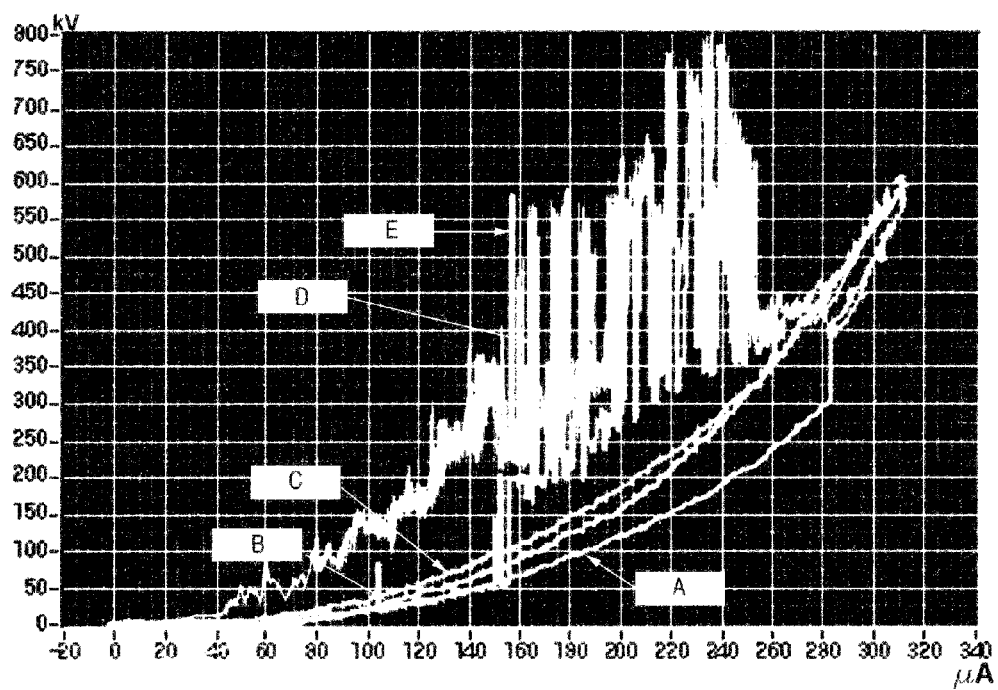
FIG. 14 is a graph showing relationship between corona discharge current and voltage of the respective lightning arresters tested using the test apparatus of FIG. 13.

As shown in the graph of FIG. 14, it will be appreciated that the lightning arrester in accordance with the present invention represented as curve E has a lower application voltage with the same corona discharge current flowing in comparison with the conventional lightning arresters represented as curves A-D.

It means that the lightning arrester in accordance with the present invention has lower probability of lightning when a thundercloud approaches, in comparison with the conventional lightning arresters.

Therefore, it is possible to remarkably reduce a probability of lightning strike onto a building to be protected from the lightning, on which the lightning arrester in accordance with the present invention is installed.

Industrial Applicability

As can be seen from the foregoing, lightning arresters in accordance with the present invention discharge space charges distributed in the air around a building by a thundercloud approaching the building and ground charges supplied from the ground before a lightning strike occurs, thereby blocking concentration of the ground charges to decrease the entire electric field of the building.

When the entire electric field of the building is decreased to less than an electric field for generating lightning (a lightning electric field), it is possible to remarkably reduce a probability of lightning.

The invention claimed is:

1. A lightning arrester comprising:
a conductive rod installed at an upper part of an object to be protected from lightning and connected to a ground means;
an insulator coupled with one end of the rod;
a connection part coupled with the rod under the insulator;
an auxiliary rod coupled with the connection part, and radially disposed in plural number centered on the rod; and
a charge pipe having a tube-shaped body through which the auxiliary rod passes and pin-shaped projections cut and bent toward the auxiliary rod and to which space charges are charged.

2. The lightning arrester according to claim 1, wherein the charge pipe is parallel to the rod.

3. The lightning arrester according to claim 1, wherein the charge pipe is vertically connected to each other in a longitudinal direction of the rod to form a two-stage structure.

4. The lightning arrester according to claim 1, wherein the auxiliary rods and the charge pipes respectively, are disposed at predetermined intervals around the rod.

5. The lightning arrester according to claim 1, further comprising:
A charge plate coupled to the rod under the insulator through the medium of an insulating body; and
a discharge means coupled with the rod under the charge plate.

6. The lightning arrester according to claim 5, wherein the insulating body is formed of a dielectric material.

7. The lightning arrester according to claim 6, wherein the dielectric material is formed of any one selected from titanium dioxide ($TiO_2$) and silicon dioxide ($SiO_2$).

8. The lightning arrester according to claim 5, wherein the charge plate has a disc plate shape having a center hole.

9. The lightning arrester according to claim 5, has an inverse parabola shape.

10. The lightning arrester according to claim 5, wherein the discharge means has a disc plate shape having a center hole.

11. The lightning arrester according to claim 1, wherein the insulator is formed of an electric insulating polymer.

12. A lightning arrester comprising:
a conductive rod installed at an upper part of an object to be protected from lightning and connected to a ground means;
an insulator coupled with an upper end of the rod;
a charge pipe having a tube-shaped body through which the rod passes and pin-shaped projections cut and bent toward the rod and to which space charges are charged;
a charge plate coupled to the rod under the insulator through the medium of an insulating body;
a discharge means coupled with the rod under the charge plate; and
a plurality of charge pins to connect the charge pipe and charge plates,
wherein the charge pin is bent such that one side of the charge pin is fixed, facing bottom surfaces of the first and second charge plates, and an opposite end of the charge pin is fixed to an inner side of the charge pipe.

13. The lightning arrester according to claim 12, wherein the insulating body is formed of a dielectric material.

14. The lightning arrester according to claim 13, wherein the dielectric material is formed of any one selected from titanium dioxide ($TiO_2$) and silicon dioxide ($SiO_2$).

15. The lightning arrester according to claim 12, wherein the first charge plate has an inverse plarabola shape.

* * * * *